Figure 1:
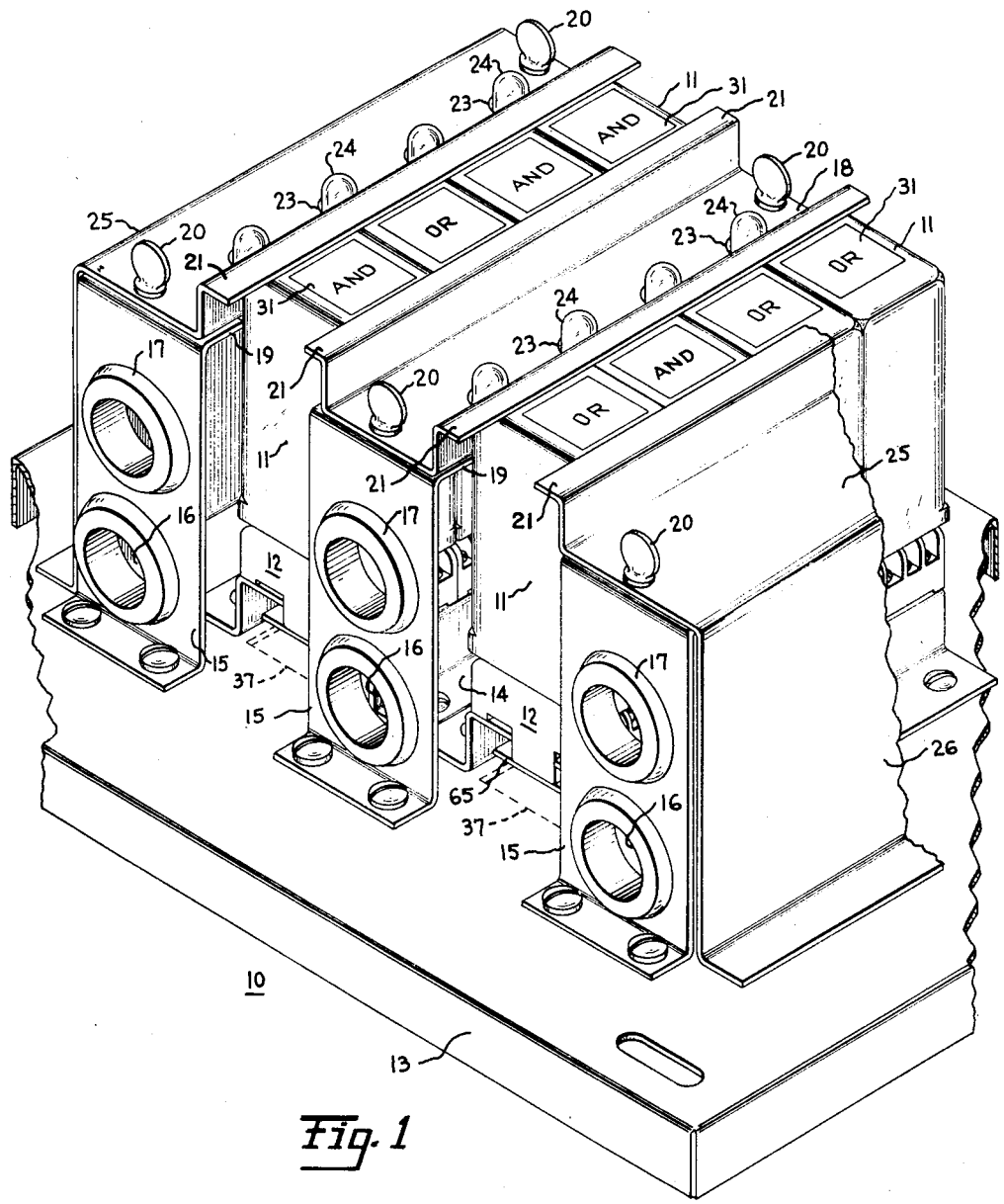

Dec. 8, 1959  C. J. ADAMS  2,916,721
ELECTRIC CONTROL PANEL
Filed Oct. 18, 1957  2 Sheets-Sheet 1

INVENTOR.
CHARLES J. ADAMS
BY *Martin Kalikow*
ATTORNEY

Dec. 8, 1959     C. J. ADAMS     2,916,721
ELECTRIC CONTROL PANEL

Filed Oct. 18, 1957     2 Sheets-Sheet 2

INVENTOR.
CHARLES J. ADAMS
BY Martin Kalikow
ATTORNEY

United States Patent Office 2,916,721
Patented Dec. 8, 1959

2,916,721

ELECTRIC CONTROL PANEL

Charles J. Adams, Bloomington, Ill., assignor to General Electric Company, a corporation of New York Application October 18, 1957, Serial No. 691,077

5 Claims. (Cl. 339—147)

My invention relates to electric control panels and more particularly to panels used to control the operations of industrial machines and tools.

The operation of industrial machines and tools has heretofore generally been controlled by electric switches and relays localized in control panels. These electric switches and relays commonly have moving contacts which are opened or closed by electromagnetic forces. More recently there have been developed electric control units having no moving contacts but which are capable when connected in suitable circuits of controlling machines and tools by variation of their internal electrical condition in accord with certain "logic" functions. These "static" control units, as they have become called, have the advantages of small size and unusually long life and reliability. They are described, for example, in an application in the name of Russell A. Brown, Serial No. 630,936 filed December 27, 1956 and assigned to the assignee of the present application. However, these static control units require many more input, output, and power supplying connections to and between the various units than electromagnetic switching devices. The panels used to package electromagnetic switching devices are thus entirely unsuited for static control devices. Moreover, the complicated wiring required to connect the static control units in suitable circuits or to replace a unit has heretofore discouraged their use.

Accordingly, a general object of the invention is to provide a control panel particularly adapted for use with static control units.

Another object of the invention is to provide a control panel of unusually small size utilizing control units requiring a plurality of input, output and power supplying connections.

An additional object of the invention is to provide a control panel in which all circuit connections can be made either in the factory or in the field and the control units easily connected into or out of the circuit.

A futrher object of the invention is to provide a control panel in which all relatively permanent connections to the control units, such as the power supplying connections, can be made by printed circuits.

A further object of the invention is to provide sockets for use in control panels adapted to make connection with and among a plurality of closely spaced plug-in prong terminals on control units mounted in these sockets.

A still further object of the invention is to provide a control panel having means for giving visual indication of the operation of the various control units in the panel.

In general, in accord with the invention, a control panel is provided having a plurality of sockets mounted in spaced rows in a manner such that the spaces between the rows form wiring troughs. Supporting strips at opposite ends of each wiring trough carry cover strips between their upper ends, which cover strips overlie the wiring troughs and preferably serve also to retain control units mounted in the sockets.

In accord with an important feature of the invention, the sockets have a plurality of plug receiving terminals in their upper surface, a plurality of wire connecting terminals accessible from the wiring troughs and a plurality of electricity receiving terminals on the bottom surface of the sockets extending below the plane of the wire connecting terminals so as to be accessible to common supply conductors.

In accord with other specific features of the invention, the supply conductors are printed on insulating strips extending beneath and preferably carried by the sockets, the supporting strips preferably have knockouts for accommodating connecting wires entering or leaving the wiring trough and the cover strips have holes for accommodating indicating lamps carried by each control unit.

Figure 2:
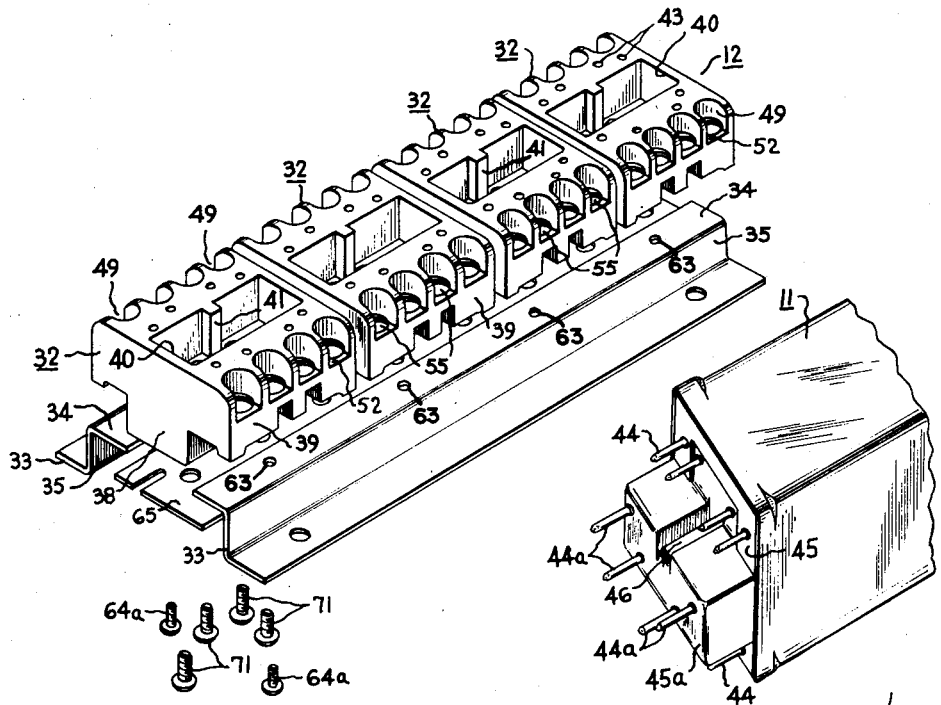
Figure 3:
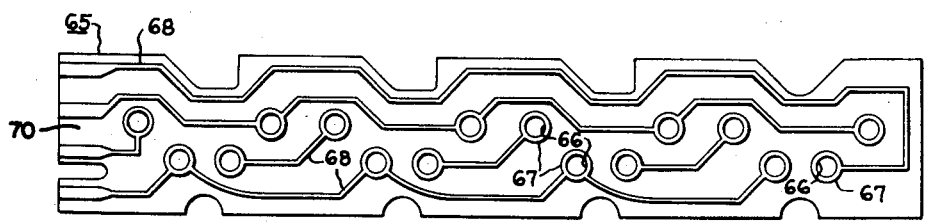
Figure 4:
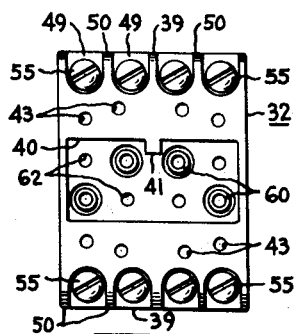
Figure 5:
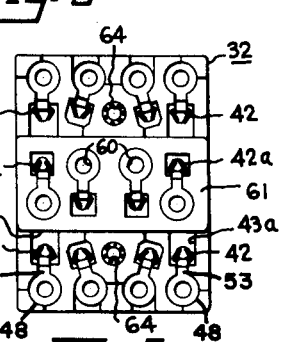
Figure 6:
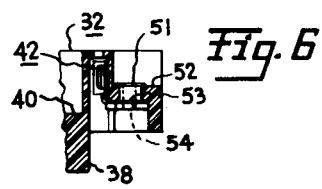

The novel features believed characteristic of the invention are set forth in the appended claims. The invention itself together with further objects and advantages thereof in which, Figure 1 is a perspective view of a control panel embodying the invention, Figure 2 is a perspective view of a socket assembly portion of the control panel of Figure 1 together with a perspective view of a control unit base portion adapted to be mounted within the socket assembly illustrated, . Figure 3 is a bottom view of a printed circuit strip member preferably used in the control parel of Figure 1, Figure 4 is a top plan view of the socket used to mount the electric control devices in the panel of Figure 1, Figure 5 is a bottom plan view of the socket of Figure 4, and Figure 6 is a detail of the plug-in terminal connector used in the socket of Figure 4.

Referring to Figure 1, a control panel 10 embodying the invention is shown in one form as comprising a plurality of control units 11 mounted on socket assemblies 12 arranged in spaced parallel rows on suitable supporting means such as a metal base plate 13. The control units 11 are not themselves the subject of this application but are described more completely and claimed in my copending application entitled "Electric Control Unit" Serial No. 691,775 filed October 22, 1957 and assigned to the assignee of the present application. The spaces between the socket assemblies 12 form wiring troughs 14. Supporting strips 15, preferably metal, are mounted on base plate 13 aligned with and at opposite ends of each wiring trough 14. These supporting strips 15 preferably contain apertures 16 lined with insulating grommets 17 for accommodating wire conductors passing into and out of the wiring troughs 14. Alternatively, supporting strips 15 may be made much narrower than the width of wiring troughs 14 and the wires passed around the opposite sides of the supporting strip. Cover strips 18, preferably also made of lightweight metal such as aluminum, extend between and are fastened to the upper ends 19 of an aligned pair of supporting strips 15 preferably by a quick connecting and disconnecting fastening means such as finger screws 20. Each cover strip 18 preferably has shouldered opposite sides 21 which overlie the top side corners of the control units 11 such that the cover strips 18 serve not only to cover the wiring troughs 14 but also to help retain the control units mounted on their respective socket assemblies. Cover strips 18 preferably also have a row of apertures 23 for accommodating indicating lamps 24 each mounted on one side of a respective control unit 11.

Side cover strips 25 are also provided to enclose and help define the wiring troughs at the opposite outer sides of the outermost rows of control units 11. The side cover strips 25 are similar to cover strips 18 but include a side cover plate 26 which extends downward to meet the base plate 13. Although only two rows of control units 11 are shown between the opposite side cover strips 25, it will be appreciated that many more such rows of control units may be provided therebetween if desired. It will also be appreciated that although only four control units are shown in each row, the length of the control panel may be increased and many more control units included in each row.

For compactness and sturdiness, control units 11 are preferably of rectangular cross section and are mounted alongside one another in substantially abutting relation. Identification of the major function of the control device is preferably printed or indicated upon the top flat surface of the control unit such as by labels 31. The shouldered sides 21 of cover strips 18 and 25 preferably terminate short of these labels to permit these identifications to be visible.

Referring to Figures 2 through 6, the means for mounting and making connection to and from the control devices 11 will now be described. Each socket assembly 12 includes a plurality of sockets 32 mounted alongside one another in a row on a pair of mounting brackets 33. Mounting brackets 33 may be mounted upon base plate 13 as shown or, alternatively, formed integral therewith. The mounting brackets 33 provide a mounting surface 34 for the sockets 32 in a plane above and spaced from the plane of base plate 13. The vertically rising side portions 35 of mounting brackets 33 in adjacent rows thus serve also to define the lower portions of the wiring troughs 14. The area between each pair of mounting brackets 33 in each socket assembly 12 provides a region for making connection to terminals on the bottom central surface of each socket as will be more fully explained hereinafter. Although in Figure 1 I have shown base plate 13 as being continuous beneath this region 36, it will be appreciated that the base plate 13 may be apertured along dashed lines 37 if desired in order to facilitate access to region from beneath the base plate 13.

Each socket 32 preferably has a rectangular horizontal cross-section and a T-shaped vertical cross-section with a central stem portion 38 and outer opposite side portions 39. A rectangular cavity 40 extends from the top surface of the socket and down along the central stem portion 38 and over substantially the entire length of the socket. A ridge or key 41 projects into cavity 40 along one side wall.

The upper surface of each socket 32 on opposite sides of cavity 40 contain unit connecting terminals preferably in the form of prong receiving terminals 42 best seen in Figure 6 located in rectangular apertures 43a immediately beneath inlet holes 43. These prong receiving terminals 42 are designed to make connection to correspondingly located prong-like elements 44 extending downward from the base 45 of control unit 11.

In accord with an important feature of the invention, the front or upper surface of socket 32 within cavity 40 likewise contains unit connecting terminals preferably in the form of prong receiving terminals 42a. These latter prong receiving terminals 42a accommodate prongs 44a upon a projecting portion 45a of base 45 in the control units 11. This projecting portion 45a fits within cavity 40 and contains a keyway 46 which accommodates key 41 of socket 32 thereby to insure proper location and orientation of the control unit on the socket during plug-in.

Wire connecting terminals 48 for making connection to the outer unit connecting terminals 42 are located along the upper side corners of the outer side portions 39 of each socket. These wiring connecting terminals 48 are each located within one of a plurality of recessed chambers 49 separated by partitions 50, these chambers opening through both the top and side surfaces of the socket whereby the terminals are easily accessible from the wiring troughs 14. Wire connecting terminals 48 are preferably of the screw-down type, as shown, and have an internally threaded member 51 extending through holes in a shelf 52 of the socket 32. This threaded member 51 of each terminal traps and makes connection to a laterally extending offset arm 53 of the prong receiving terminal 42 to which it is adjacent. Wire connecting screws 55 of terminals 48 are screwed into the upper portion of this threaded member 51. In fastening threaded member 51 to the extension portion 53 of prong receiving terminal 42, the threaded member 51 is inserted through the aperture 54 of extension portion 53 and through a corresponding aperture in shelf 52 and spun over at the top against the upper surface of this shelf thereby to securely fasten the entire terminal assembly to the socket.

Electricity connecting terminals 60 for making connection with the central unit connecting terminals 42a located within recess 40 are provided along the bottom surface 61 of the stem portion 38 of socket 32. These terminals are identical with the wire connecting terminals 48 with the exception that the screws are threaded into the terminals from the bottom rather than from the top. Since the stem portion 38 of each socket extends below the mounting surface of the socket represented by the upper shoulders 34 of the mounting brackets 33, the central terminals 42a are easily accessible for connection from beneath or behind these sockets. The electricity connecting terminals 60 extend within circular apertures in the bottom wall of the stem portion 38 alongside apertures 62 therein which accommodate the prong receiving terminals 42a.

The sockets 32 are mounted on the brackets 33 by means of screws 64a extending through holes 63 in the supporting surfaces 34 and into internally threaded inserts 64 in the bottom walls of side portions 39 of the insulating socket. If desired, a strip of insulating paper may be inserted between the sockets and the mounting surface 34 of brackets 33 to protect against any possible grounding of the wire connecting terminals 48.

In order to make the desired electrical connections to and between the electricity connecting terminals 60, I preferably provide a printed circuit strip member 65, a bottom view of this strip member being shown in Figure 3. This strip member 65 is an insulating board or strip having a plurality of circular holes 66 registering respectively with the terminals 60 of the various sockets. Conductive rings 67 are printed on the undersurface of insulating strips 65 around the rim of each hole 66. Conductive ribbons 68 are also printed along this undersurface in spaced relation to one another and making connection to and between the various conducting rings 67 in accord with a predetermined circuit. These conducting ribbons 68 preferably terminate adjacent one end 70 of the insulating strips 65 whereby wired connection to and between the various strips may be made, if desired. The physical connection between the conducting rings 67 and each of the terminals 60 respectively located above these conducting rings 67 is made by screws 71 inserted through the hole 66 and threaded into the terminals 60. When these screws are tightened, their heads are brought into intimate contact with the conducting rings 67 and the electricity is carried through the screws to the terminals 60. It will be appreciated that these screws serve not only to make the electrical connections to these terminals 60 of the sockets, but also to support the insulating strip 65 on the bottom surfaces of the stem portions 38 of these sockets. Moreover, since the conductors are printed on the undersurface of the insulating strip 65, the desired electrical clearances between this strip and the mounting brackets is insured. It will also be appreciated that in those applications where the use of a printed circuit strip member 65 is not deemed desirable, wired connections may be directly made to electricity connecting terminals 60 in a conventional manner by trapping wires under screws 71.

In the assembly and use of the control panel 10, sockets 32 are first mounted on brackets 33 by means of screws 64a inserted through holes 63 and threaded into inserts 64. Printed circuit strip member 65 is then connected to the bottom surface of these sockets by means of screws 71. The resulting socket assemblies 12 are mounted on the base plate 13 of the control panel and the supporting strips 15 also mounted on the base plate 13 aligned with the wiring troughs 14. The various wire connections (not shown) to and between the wire connecting terminals 48 are then made by wires running within the wiring troughs 14 and extending through apertures 16 of supporting strips 15. Control units 11 are then plugged into the sockets 32 and cover strips 18 and 25 fastened to the supporting strips to complete the assembly. In order to remove a control unit it is then necessary only to remove the particular cover strips which overlap the control unit involved and to pull the control unit out of its socket.

While I have shown a particular embodiment of the invention, many modifications may be made, and it is to be understood that I intend by the appended claims to cover all such modifications as fall within the true spirit and scope of the invention.

What I claim as new and desire to secure by Letters Patent of the United States is:

1. An electric control panel comprising a plurality of T-shaped sockets of insulating material having an upper portion, a dependent stem portion, and a central cavity in the upper surface thereof above said stem portion, means mounting said sockets in a common plane with the stem portions of each socket extending below said mounting plane, said sockets each having plug-in unit connecting terminals on a topmost surface adjacent said central cavity and plug-in unit connecting terminals in the upper surface within said cavity, wire connecting terminals for the plug-in terminals in said topmost surface accessible from above said mounting plane, at least two electricity connecting terminals for the other of said plug-in terminals on the bottom surface of said stem portion, and an insulating strip extending beneath said sockets and having a plurality of conductors printed thereon connected to said electricity connecting terminals.

2. An electric control panel comprising a base plate, a plurality of sockets, mounting brackets attached to said plate and mounting said sockets alongside one another in spaced parallel rows, said brackets defining wiring troughs between said rows, each socket having unit connecting terminals on the top thereof, wire connecting terminals on opposite sides thereof opening into said wiring troughs and a plurality of electricity connecting terminals on the bottom thereof, and insulating strips each beneath a respective row of sockets, each of said strips having a plurality of conductors printed thereon connected to said electricity connecting terminals.

3. A socket for an electric panel comprising an insulating body having a central cavity in the upper surface thereof, a plurality of plug-in terminals opening into the upper surface of a first portion of said socket bordering said cavity, a plurality of additional plug-in terminals opening into the upper surface of a second portion of said socket within said cavity, and a plurality of electricity connecting terminals on the bottom of said second portion connected to said additional terminals.

4. The socket of claim 3 comprising a plurality of wire connecting terminals accessible from a side of said socket and connected to said plug-in terminals opening into the upper surface of said first portion.

5. An electric control panel comprising a base plate, a plurality of sockets, means mounting said sockets in spaced parallel rows in a plane above the plane of said base plate with a portion of each socket extending below said mounting plane, said mounting means defining a channel forming a portion of a wiring trough, each of said sockets having a plurality of plug-in unit connecting terminals accessible from a top surface and a plurality of wire connecting terminals for said unit connecting terminals accessible from said wiring trough, an additional plurality of plug-in unit connecting terminals accessible from the top surface of the extended portion of each socket, said extended portion having electricity connecting terminals on its bottom surface connected to the additional unit connecting terminals, and separate insulating strips each extending beneath a respective row of sockets and having printed thereon a plurality of conductors respectively connected to said electricity connecting terminals.

References Cited in the file of this patent

UNITED STATES PATENTS

| 1,023,326 | Murray | Apr. 16, 1912 |
| 1,487,369 | Berthold | Mar. 18, 1924 |
| 1,636,277 | Benjamin | July 19, 1927 |
| 2,586,854 | Myers | Feb. 26, 1952 |
| 2,599,710 | Hathaway | June 10, 1952 |

FOREIGN PATENTS

| 507,108 | Great Britain | June 9, 1939 |
| 893,389 | France | June 7, 1944 |
| 630,025 | Great Britain | Oct. 4, 1949 |
| 743,490 | Great Britain | Jan. 18, 1956 |
| 778,273 | Great Britain | July 3, 1957 |

OTHER REFERENCES

Electrical Mfg., 1 page, November, 1955.